(No Model.)

J. W. BRAINARD.
MACHINE FOR MAKING BLIND SLATS.

No. 283,372. Patented Aug. 21, 1883.

Witnesses
Thos. E. Crail
Geo. F. Robinson

Inventor
Joseph W. Brainard
by Bradford Howland
Attorney

UNITED STATES PATENT OFFICE.

JOSEPH W. BRAINARD, OF KENT, OHIO.

MACHINE FOR MAKING BLIND-SLATS.

SPECIFICATION forming part of Letters Patent No. 283,372, dated August 21, 1883.

Application filed November 16, 1882. (No model.)

*To all whom it may concern:*

Be it known that I, JOSEPH W. BRAINARD, of Kent, Portage county, Ohio, have invented a new and useful Improvement in Machines for Making Blind-Slats, of which the following is a specification.

The main feature of my invention is a rotary saw formed with cutting or smoothing edges on its sides.

Figure 1:
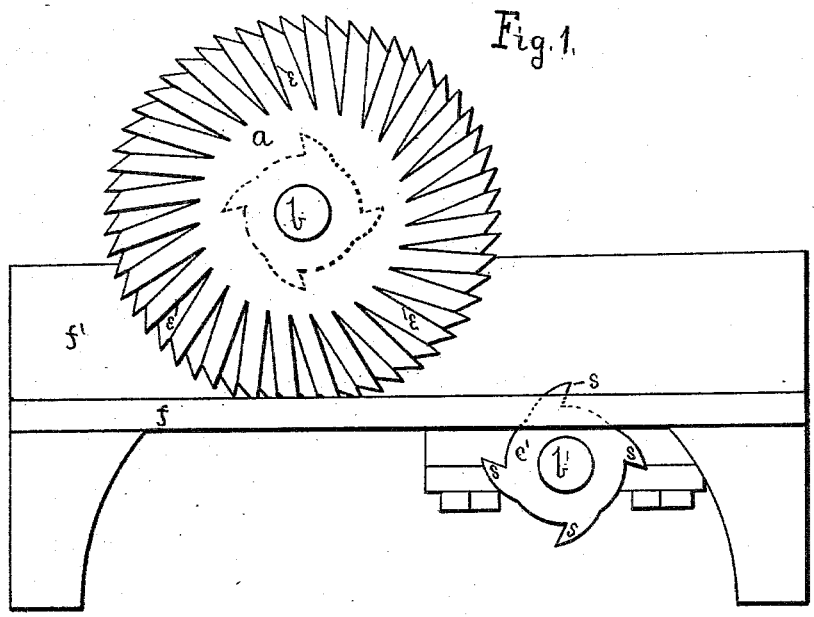
Figure 2:
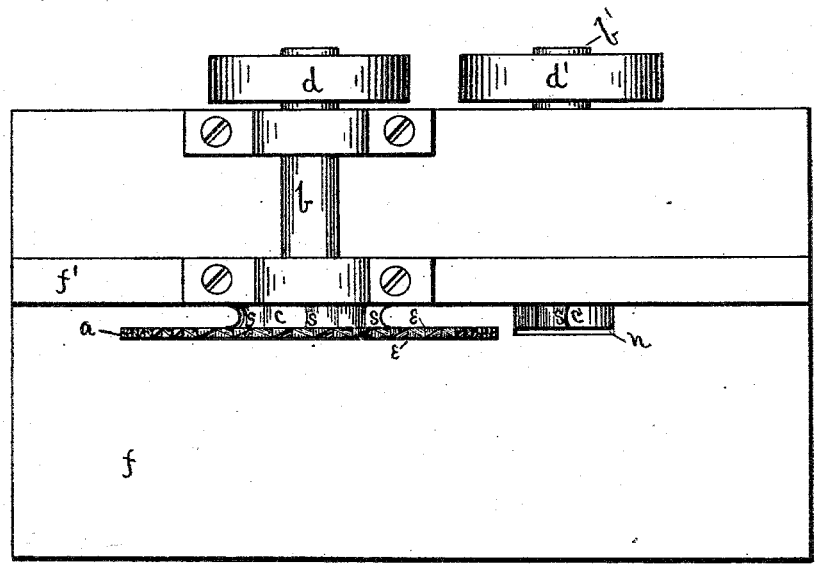

In the drawings forming a part of this specification, Figure 1 is a side elevation, and Fig. 2 is a plan.

The rotary saw $a$ and cutter $c$ are mounted together on shaft $b$, the position of the cutter being indicated by dotted lines in Fig. 1. They are supported by a suitable frame, $f f'$, and rotated by means of pulley $d$. Cutting-edges $e$ are formed on both sides of saw $a$, for the purpose of smoothing the sides of the blind-slats, which would otherwise be left rough from the operation of the saw. These edges $e$ extend inward from the circumference of the saw, and are made by furrowing each side of the saw at every alternate tooth or farther apart, as may be deemed desirable, the furrows gradually decreasing in size from the circumference of the saw toward its center. In this form the furrows are more easily cleared of sawdust by the centrifugal force of the rotating saw. Each edge $e$ joins with the edge of one of the saw-teeth. Cutter $c$ is placed on shaft $b$ close against the back side of saw $a$ and between it and the upright part $f'$ of the frame. Cutter $c'$ is similar to cutter $c$, and is in the same vertical plane. They are formed with concave cutting edges or teeth $s$ to shape the edges of the blind-slats, which are usually made convex. Cutter $c'$ on shaft $b'$ is rotated by means of pulley $d'$. For the purpose of allowing the teeth $s$ of cutter $c'$ to project above the horizontal part or table $f$, the latter is slotted at $n$. The upright part $f'$ is at right angles to the table $f$, and acts as a guide or gage in making the blind-slats.

In operating the machine a plank from which the blind-slats are to be formed, and having a thickness a little greater than the desired width of the slats, is placed on table $f$, with one edge against guide $f'$, to be subjected to the operation of saw $a$ and cutters $c\ c'$. Both sides of the cut made by the saw are smoothed by the edges $e$, and cutters $c\ c'$ shape the edges of the slat cut off by saw $a$. At each succeeding operation of the saw and cutters on the plank a blind-slat will be shaped and finished, the edge of the plank forming one side of the slat having been planed or smoothed off by the preceding operation. Table $f$ is slightly cut away or grooved beneath the saw for the lower edge of the latter to extend below the top of the table.

The saw and cutters may be made adjustable by any ordinary and well-known means for making blind-slats of different thickness and width. In place of the rotary cutters $c\ c'$, stationary cutters may be used, if preferred.

The machine herein described, while more particularly intended and adapted for making blind-slats, may also be used for shaping and finishing other articles by changing the form of the cutting edges or teeth $s$ to shape, as may be desired, the edges of such other articles.

I claim as my invention—

1. The circular saw $a$, having its sides furrowed to form cutting-edges $e$, and cutter $c$, arranged together on shaft $b$, and the radius of saw $a$ being as much greater than that of cutter $c$ as the width of the blind-slat to be made, in combination with frame $f$, having an upright part or guide, $f'$, substantially as described.

2. The circular saw $a$, formed with cutting-edges $e$ on its sides, and frame $f$, having an upright part or guide, $f'$, in combination with cutters $c\ c'$, arranged one above the other to shape the opposite edges of a blind-slat while it is being operated on by saw $a$, substantially as described.

JOSEPH W. BRAINARD.

Witnesses:
    BRADFORD HAWLAND,
    GEORGE F. ROBINSON.